United States Patent [19]
Todd et al.

[11] 3,728,540
[45] Apr. 17, 1973

[54] PRESSURE-MODULATED MULTIPLE GAS ANALYZER

[75] Inventors: Marion N. Todd, Glendora; D. Michael Milder, Sierra Madre, both of Calif.

[73] Assignee: Tetra-Tech Incorporated, Pasadena, Calif.

[22] Filed: Aug. 27, 1971

[21] Appl. No.: 175,657

[52] U.S. Cl. ............................... 250/43.5 R, 356/51
[51] Int. Cl. ............................................. G01n 21/26
[58] Field of Search ............................... 356/51, 97; 250/43.5 R

[56] References Cited

UNITED STATES PATENTS

3,005,097  10/1961  Hummel ..................... 250/43.5 R
3,600,091  8/1971  Goleb ........................... 356/97

*Primary Examiner*—Ronald L. Wibert
*Assistant Examiner*—V. P. McGraw
*Attorney*—Peter I. Lippman

[57] ABSTRACT

Small, inexpensive apparatus is disclosed for precisely analyzing gas samples through radiation-absorption measurements, employing pressure modulation, a sealed calibration gas cell optically in series with the sample cell, synchronous demodulation, and preferably time-resolved spectral analysis and a captive computer for matrix inversion to read out gas constituent concentrations directly.

11 Claims, 3 Drawing Figures

PATENTED APR 17 1973 3,728,540

PRESSURE-MODULATED MULTIPLE GAS ANALYZER

BACKGROUND OF THE INVENTION

This invention relates to quantitative analysis of gaseous specimens, and has applications in many diverse fields including air-pollution monitoring and clinical medicine. The invention permits detection, identification and quantitative analysis of a wide variety of gaseous elements and compounds present in minute concentrations in air or other gaseous substrates, by means of extremely sensitive measurements of radiation absorption.

Many kinds of instruments have been used for gas analysis by radiation absorption. Those heretofore providing sufficient sensitivity and reliability for precision measurements in the parts-per-billion range have been large, expensive laboratory infrared absorption spectrometers, Raman spectrophotometers, gas chromatographs or molecular mass spectrometers. Such instruments might typically require one or more skilled attendants, occupy floor space of dimensions 10×4 feet, stand 5 feet tall, weigh a large fraction of a ton, draw several amperes at 230 Vac, and require cooling water or other special utilities for proper operation. Such instruments might typically have selling prices between $50,000 and $150,000. Such devices are thus entirely unsuited for the multiple-installation and low-budget requirements of smog monitoring or routine clinical testing.

Certain smaller infrared absorption instruments have recently been made available which feature reasonably small size, weight and price — but their sensitivities are inadequate for the considerable demands of atmospheric or biological gas analysis. Lacking the extreme stability of the instrumental radiation source, detector, and thermal environment of the larger, more expensive units, these smaller instruments have failed to satisfy the needs of these demanding markets.

These prior-art smaller instruments have been fashioned generally after the larger, laboratory instruments, in employing scanning grating monochromators and double-beam radiation systems in which a "chopper" or radiation interrupter modulates the radiation to obtain ac electrical signals from the detector or detectors, and a beam-separator alternately directs the radiation beam along a sample path and a reference path, in the latter of which a standard specimen is constrained, so that the detector signal alternately represents the absorption of sample and standard. In some instruments the chopper and beam-separator are functionally combined into one device.

These techniques while satisfactory in the laboratory instruments are inadequate to provide stable measurements in the smaller units. Far from solving the problem of obtaining stability in sample and standard measurements, they tend to complicate and worsen the sensitivity because the temperature of the moving chopper and of the beam separator is not, in the small instruments, readily susceptible to control. Thus these components act as variable and unknowable sources of infrared radiation reaching the detector. Since the radiation arising thermally at, for example, the chopper blade is exactly out of phase with the radiation passing through the chopper orifice when the blade does not block the beam, the variable and unknowable radiation flux from the chopper subtracts directly from the radiation flux amplitudes to be measured. Substantially the same effects arise at the beam-separator, when a separate dynamic device is used for this purpose. Moreover, the chopper and beam-separator act as reflectors, as well as sources, of radiation; that is, when they are obstructing the measurement beam they can reflect radiation arising at various internal parts of the instrument toward the detector. Such reflected radiation, too, can be almost exactly out of phase with the measurement radiation pulses, and so can subtract from (or add to) the radiation flux amplitudes to be measured. Analysis and control of such reflected radiation levels is difficult in the smaller instruments, particularly where the degree of control available for the instrument's eventual thermal environment is unknown and generally poor.

In an effort to overcome some of these problems, Hummel (U. S. Pat. No. 3,005,097) has disclosed a modulation system which eliminates the need for displacing a macroscopic object (such as a beam-separator or a chopper) in the measurement radiation beam. Hummel shows that modulating the pressure of the gas specimen causes modulation of the extent of absorption by the specimen in all of its absorption lines — that is, at all wavenumbers at which the specimen absorbs radiation. Thus Hummel is able to obtain from his detector an ac signal which is proportional to the specimen concentration.

However, all of the arrangements shown by Hummel are deficient in certain regards, and nowhere does he indicate an appreciation for these problems or possible means to their solution. Particularly, Hummel's systems all suffer from rather poor sensitivities because most of the radiation from his sources is permitted to impinge on his detectors. At most Hummel uses multiple-absorption-line gas filters to eliminate the effects of "disturbing gases" — that is, gases which interfere with measurements of the particular gas constituents whose quantitative analysis is sought. The excess, unused radiation heats the detector(s), increasing the thermally-generated noise therein and thereby limiting the signal-to-noise ratio of the measurement.

His systems are further disadvantageous in that, where a reference-standard gas is required, a continuous source of such gas must be available during operation of the instrument; and the continuing precision and accuracy of measurements depends as well on the continuing stability and accuracy of the constitution of the reference-standard gas.

Yet a third class of disadvantages resides in the limitation of Hummel's apparatus to analysis for one gas constituent — or at most two or three, at the cost of considerable additional complexity, awkwardness, cumbersomeness and unreliability of the apparatus.

The present invention obviates all of these difficulties, providing gas-analysis equipment with the sensitivity of large, laboratory absorption spectrometers, gas chromatographs or molecular mass spectrometers, direct readout of numerous sample component concentrations, small size, minimum reliance on high-precision components and procedures, high reliability and precision of measurements, positive self-calibration requiring no renewable flow of reference-standard gas — and all in an inexpensive package.

Some of the terminology used in the preceding paragraph will now be specified: "sensitivity" refers to detectable values of a trillionth, or even a 10-trillionth, of a radiant watt, depending on absorptivity of the specimen, or 1 part in a 100 million in terms of gas concentration, for such gases as carbon dioxide, carbon monoxide, or nitrous oxide, or for water vapor; by "small" is meant a package having external dimensions 12×6×4 inches, or with display devices included 12×12×6 inches; by "numerous sample component concentrations" is meant the capability to obtain quantitative analyses for a dozen or even more different gas constituents simultaneously; by "inexpensive" is meant a total sales price in the neighborhood of $5,000 to $10,000.

SUMMARY OF THE INVENTION

All of the above-enumerated capabilities and advantages are attained in accordance with the present invention, which provides:

a single-beam radiation system;

a pressure-modulated sample cell for containing the gaseous specimen to be analyzed;

a sealed calibration cell in series with the sample cell and filled with a suitable calibration gas, such as carbon dioxide, which has absorption lines spaced throughout the spectral region of interest;

an arrangement for pressure-modulating the calibration cell instead of the sample cell without disturbing the sealed condition of the calibration cell;

an arrangement for limiting the radiation reaching the detector to just one narrow spectral interval at a time — or in embodiments having more than one detector, an arrangement for limiting the radiation reaching each detector to just one narrow spectral interval at a time;

an arrangement for obtaining individual measurements of radiation flux reaching a detector for more than one such narrow spectral interval, that is, for radiation of a plurality of different nominal wavenumbers, either sequentially or in spatial separation;

synchronous demodulation of the detector output signal, to accept and use only signals having appropriate time phase with respect to the modulation, thereby minimizing error otherwise present in the measurement due to spurious signals at other frequencies and/or phases than the modulation frequency and phase; and a small captive computer, or large time-shared computer, for determination of the gas constituent concentrations from the measurements and certain known system parameters.

Because the demodulator arrangement accepts for measurement only that part of the detector output which varies synchronously with the sample density variations, the measurement signal is proportional to, and only to, the quantity of interest — namely, the net sample radiation absorption at the selected wavenumber. This provides a simplicity of readout relative to conventional systems in which the output signal is proportional to transmission, and in which absorption must be calculated from the transmission as a logarithm. The present synchronous-acceptance system also cancels any static radiation anomalies due to instrument imperfections such as individual source characteristics, absorption in the optics and sample cell, or slight variations in detector sensitivity. Moreover, slight long-term changes in the instrument's spectral transmittance are of no importance, since the measurements are essentially instantaneous (one-half cycle at the modulation frequency) absorption comparisons at two sample densities. Even substantial long-term transmittance changes are accommodated readily by occasional calibration checks, with little sacrifice of accuracy.

Of particular importance, the instrument is rendered insensitive even to spurious signals having the same frequency as the modulation frequency — such as, for example, microphonic behavior of source or detector in response to the modulation mechanisms — provided that such signals do not happen to be exactly in phase with the measurement signals expected on account of the modulation.

Thus a virtually complete insensitivity to instrument optical anomalies can be obtained through specialized application of synchronous pressure modulation, a series calibration cell, and spectral analysis provisions in accordance with the teachings of the present invention.

BRIEF DESCRIPTION OF THE DRAWINGS

A more comprehensive understanding of the principles and advantages of the present invention can be had from reference to the following description of embodiments and the accompanying figures, of which:

FIG. 3 being also partially schematic and partially cutaway orthographic projection.

DESCRIPTION OF THE PREFERRED EMBODIMENTS

Figure 1:
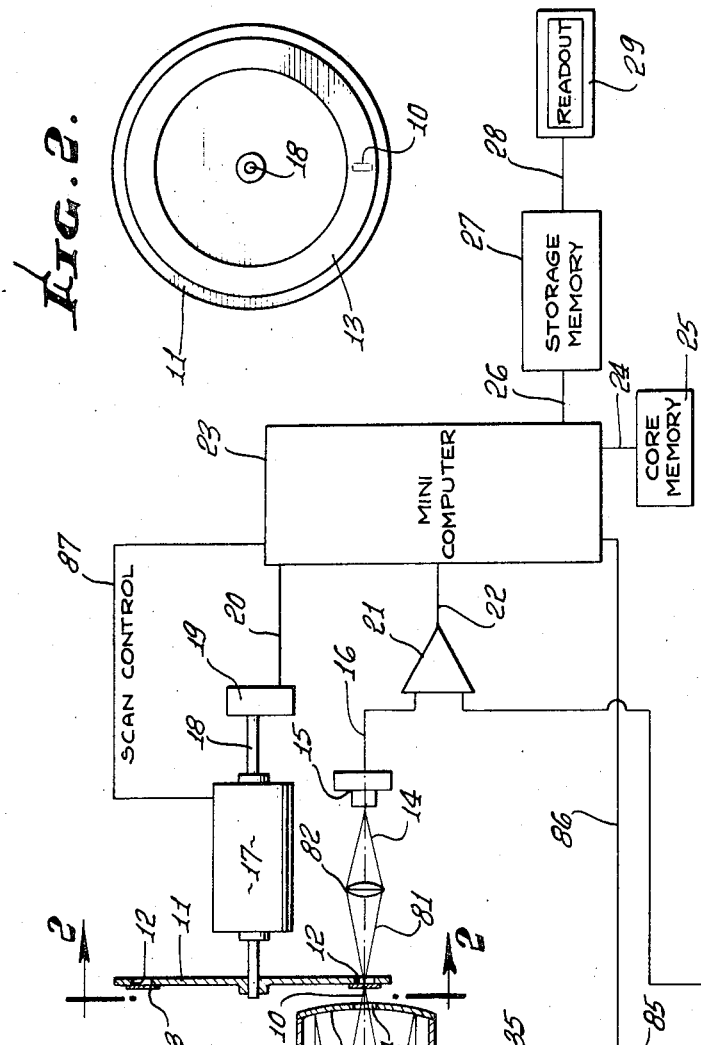
FIG. 1 is partially a schematic drawing and partially a cutaway orthographic projection of one preferred system embodying the present invention.

The system shown in FIG. 1 measures concentrations of $NO_x$ (oxides of nitrogen), $SO_2$ (sulfur dioxide), $H_2S$ (hydrogen sulfide), CO (carbon monoxide), mercaptans, and C-H, the last-mentioned representing hydrocarbons in general, undifferentiated as to type. A separate ultraviolet source and detector (not shown) can be included, sharing the same radiation path, to provide a measurement of $O_3$ (ozone) concentration.

The source 1 projects infrared radiation at 2 along a radiation path whose center line is indicated at 60. The source is advantageously a 60 percent black-body metal filament heated to 2,000 ° K, with a dc power source regulated for short-term stability. Source radiation in the 2.5 to 7.0 micron wavelength range, or in wavenumber measure 4,000 to 1,400 $cm^{-1}$ (wavenumbers), is used by the spectral-analysis and detection devices which will be described below.

Lens 3 accepts radiation at $f/1.0$, and projects source radiation at 4 through infrared-transparent windows 6 of calibration cell 5 for convergence at 7 to a source image at aperture stop 80.

Radiation proceeds therefrom to undergo slight refraction in traversing infrared-transmitting windows 83 and 84 in curved end-plates 9 of symmetrical multipass cell 8, which is in one preferred embodiment 15 cm long and 4 cm in diameter. Most of the radiant flux undergoes three longitudinal passes of the cell, between entrance via window 83 and exit via window 84, on account of the reflective and focal properties of the internal surfaces of end-plates 9.

Figure 2:
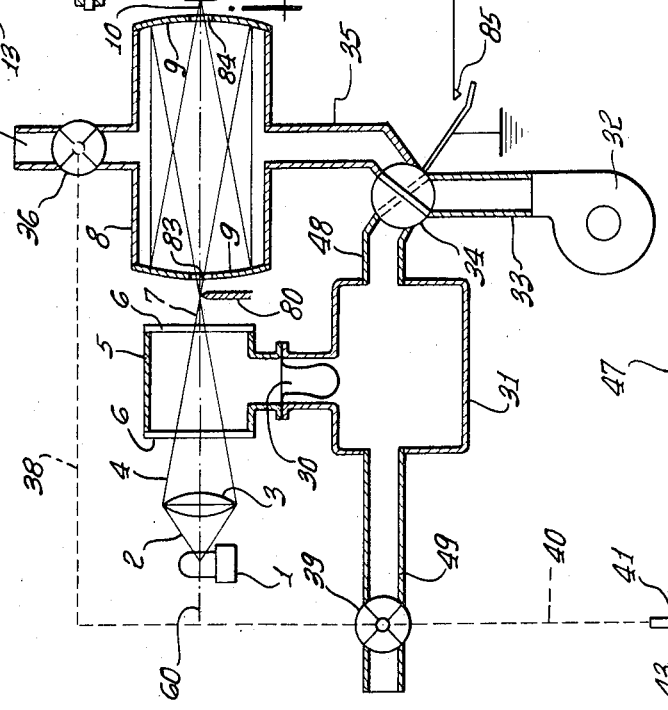
FIG. 2 is an orthographic projection illustrating one form of spectral analyzer apparatus which also appears in FIG. 1, the view of FIG. 2 being taken along the line 2—2 indicated in FIG. 1.

Radiation then exists at 10, converging again to a focus at annular strip 13 arranged to cover annular slot 12 in rotating disc 11, which is mounted to rotary shaft 18 of motor 17. Impingement of the beam at 10 upon annulus 13 on disc 11 is illustrated at better vantage in FIG. 2.

The annular strip 13 mounted to disc 11 is a circular variable interference filter — that is, a thin strip of material having different thickness at different points along the annulus strip, and acting as an interference filter to provide high transmission gain for radiation of a certain wavenumber for each location along the strip, and low transmission gain for radiation of other wavenumbers. Different radiation wavenumbers are thus effectively selected for transmission through annulus 13 by operation of motor 17 to bring different points along the annulus into position for impingement of beam 10. Devices available commercially and suitable for this purpose have range of 2.0 to 8.0 microns (5,000 to 1,250 cm$^{-1}$), and bandpass of 1.5 percent of the central wavenumber value at each location along the annulus. The filter is driven by motor 17 at constant 3 rpm.

The selected-wavenumber radiation proceeds then at 81 for focus by lens 82, which forms beam 14 converging at $f/1.0$ to an image occupying 90 percent of the sensitive surface of InSb photovoltaic detector 15. The latter is advantageously 0.5×2.5 mm and Peltier-cooled to 120°K.

In normal operation rotary pump 32 impels specimen gas such as air from its input into conduit 33 and therethrough to two-way valve 34. When the valve is set as indicated by the solid lines in FIG. 1, specimen gas flow may continue via conduit 35 into sample cell 8. When cyclically operated valve 36 is open, flow continues to ambient via vent 37. Valve 36 is advantageously a rotary type, driven through linkages 38 and 40 from shaft 41 of motor 42. When the valve 36 is closed, pressure in cell 8 approaches the pressure which pump 32 is capable of developing; a small centrifugal pump with 15 psig capability is adequate, and will cause sample-cell pressure fluctuation to occur between roughly 1 and 2 atmospheres absolute.

Under these circumstances, the beam 10 leaving window 84 is modulated in intensity at the wavenumbers corresponding to absorption by constituents of the specimen gas. When shaft 18 and annulus 13 are in such a position as to select one of these wavenumbers, the narrow-spectral-interval radiation at 81 will be correspondingly modulated in intensity, resulting in a varying component of flux being sensed at detector 15, and an ac component of electrical signal leaving the detector at 16.

The small static absorption due to gas in calibration cell 5 does not significantly disturb the system response to pressure-modulated specimen gas in cell 8.

As the shaft 18, disc 11 and annulus 13 rotate, while the pressure modulation continues, the flux modulation at detector 15 and the corresponding magnitude of the ac signal at 16 will vary depending upon the wavelengths selected by annulus 13 and the quantitative presence of constituents absorbing at such wavelengths in cell 8.

The flux reaching detector 15 may also vary on account of intensity fluctuations at source 1, or by virtue of microphonic effects tending to displace the filament of source 1 laterally or longitudinally with respect to the axis 60. The response of detector 15 may also vary in apparent magnitude by virtue of power-supply fluctuations affecting its excitation, or microphonic effects dynamically displacing the sensitive areas of the detector with respect to axis 60. Further the output of detector 15 will vary in correspondence with all of these flux variations, and moreover the output will vary on account of stochastic effects — including the random arrival of photons at the sensitive surface, and statistical variations in photoconductivity arising from thermal effects in the sensitive surface, even at the low temperature previously mentioned.

However all of these effects relative to the signal 16, directed to an input terminal of amplifier 21, are absent or greatly reduced in the output signal at 22, by virtue of the fact that amplifier 21 incorporates a synchronous demodulator. The demodulator circuitry is keyed from the modulation mechanism, as suggested by magnet 43 mounted for rotation with shaft 41 of drive motor 42, and juxtaposed reed switch 44, 45, which periodically closes and thereby grounds input line 47 of amplifier 21, at ground point 46.

Many other arrangements for deriving a keying signal for the synchronous demodulator in amplifier 21 could of course be substituted.

Amplifier 21 accepts signals at 16 for processing and output at 22 only when such signals are varying cyclically and only when they have minimum amplitude (corresponding to minimum radiant flux at detector 15) when the pressure in cell 8 is maximum, and maximum amplitude when the pressure in cell 8 is minimum — that is, when they have the same frequency as, and "appropriate" phase with respect to, the pressure modulation. The positioning of magnet 43 on shaft 41 is adjusted at instrument assembly with respect to the relationship between shaft 41 and valve 36, to ensure this condition.

Spurious fluctuations in output signals at 22 are further greatly reduced through provision of an output filter in amplifier 21, to average each processed measurement signal over many cycles of the modulator.

When two-way valve 34 is set to the calibration position, indicated in FIG. 1 by the dashed lines, pump 32 impels air via conduit 48 into auxiliary chamber 31, whence conduit 29 and valve 39 operated via linkage 40 from shaft 41 and motor 42 provide cyclical gas flow and consequently cyclical pressure variation. Compliant seal 30 between chamber 31 and cell 5 permits pressure variations in chamber 31 to be transmitted faithfully to cell 5, without disturbing the sealed character of cell 5 or varying the constituency of reference-standard gas placed therein at manufacture. Thus setting valve 34 to the position indicated in FIG. 1 by the dashed lines causes modulation of the gas pressure in calibration cell 5 instead of that in sample cell 8; and system operation is now as described in the preceding paragraphs for sample modulation except that the detector signals 16 now reflect the constituency of the reference-standard gas in cell 5 rather than that in sample cell 8, and the small static absorption in sample cell 8 due to the gas constituents therein does not significantly disturb the system response to the reference-standard gas.

When the valve 34 is set for calibration measurements (as indicated by the dashed lines in FIG. 1), the calibration-related signals at 22 enter a small computer 23, which also receives signals at 20 from a shaft encoder 19. The latter may be a potentiometer mounted to shaft 18, or alternatively an optical device comprising a rotating element with opaque and transparent segments, respectively obstructing and transmitting light from an auxiliary source to an auxiliary photocell, or as another alternative a "resolver" having electrical coils mounted to the rotary shaft 18. Other types of encoder are also quite usable, but in any event the signal at 20 provides information to computer 23 as to the angular orientation of shaft 18, disc 11 and annular interference filter material 13, and thus as to the wavenumber of radiation being selected by the filter 13 for transmission at 81 and 14 to detector 15.

In this way each measurement signal 22 received by computer 23 is correlated respectively with the wavenumber of radiation giving rise to that measurement signal.

The computer may also receive information as to the position of valve 34, as by grounding contacts 85 operating with valve 34 and signal line 86, or this information may be entered manually. In any event the computer registers the processed measurement signals at 22 in correlation with the respective wavenumber data at 20 in core memory 25, accessible via signal lines 24; when the valve 34 is set for calibration, the computer enters the calibration data in the core memory without extensive processing (as described below for the specimen measurements).

However, when the valve 34 is set for specimen-gas measurements, while the computer 23 still receives data at 22 and 20 as during calibration, the processing is substantially different. Consider the case of the computer being programmed to analyze for three gas constituents; it will in general require measurements at at least three wavenumbers to accomplish this. Each of the three measurements in general will include a contribution from each of the three constituents (and it is here assumed that there are only three significant constituents). Separation of the effects of the three constituents, from the three lumped-effect measurements, requires solution of three simultaneous equations in three unknowns. Quantitative determination of the specimen constituents also requires information as to the sensitivity of the instrument at each of the three wavenumbers, and information as to the absorptivities of the three constituents. Solution of the equations, and insertion of the numerical data, are accomplished by the computer. In performing these steps the computer uses the calibration data obtained with the valve 34 set for calibration, to provide instrument sensitivity values; and uses absorptivity information pre-programmed into the core memory 25 (or the storage memory 27).

The constituent concentrations may be directed at 26 to storage memory 27, for storage until readout is later commanded, as at readout unit 29 accessed via signal line 28.

Motor 17 may be operated continuously as mentioned above, or alternatively may be controlled from an automatic sequencer which may be thought of as part of the computer 23, via scan control line 87, to step from one wavenumber setting of interest to the next, allowing suitable dwell intervals for more efficient use of available measurement times. During such dwell intervals the output filter (mentioned earlier) in amplifier 21 may average each signal over many modulation cycles, obtaining particularly precise measurements, for relatively low modulation rates.

Optionally, when the system is operated in the calibration mode, the computer may be programmed to recognize the pattern or sequence of absorption-line spacings and heights, and re-initialize the scan control phasing — thereby to compensate for overall degradation of the interference filter as well as deterioration of other optical components.

Computer 23 and memories 24 and 27 should also be considered as options, replaceable for laboratory applications by a direct line to readout device (e.g., chart recorder) 29 for provision of ordinary absorption spectra plots or the like. In such embodiment, isolated absorption features belonging to known compounds are convertible to parts-per-million concentration estimates with the aid of a transparent spectrum overlay containing reticle scales prepared for the compounds of interest. The output-processing hardware 23, 24, 27 is more typically included for field applications where efficient, untended data collection is important.

Further, for some applications, all or part of computer 23, memories 24 and 27, and readout 29 may be accessed to the amplifier 22, shaft encoder 20, and optionally switch 85 and motor 17, by remote transmission lines, and may thus be located in a central monitoring laboratory, rather than directly at the field site of the instrument proper.

In principle, either the pressure modulation or the wavenumber-variation cycling may be more rapid (in terms of cycles per unit time); though as has been indicated above the present system uses more rapid pressure modulation.

The spectral-interval-limiting means shown in FIG. 1 in the form of variable filter 13 rotating with disc 11 and shaft 18 of motor 17 may be equivalently replaced by other serial-selection spectral-interval-limiting means; or the spectral-interval-limiting means may be a spatial-separation device such as a prism or grating operated by a scanning motor, or a fixed prism or grating followed by an array of lenses 82 and respective detectors 15. However the particular device described above is unusually advantageous in use, as already noted.

The ratio of modulation amplitudes in the two cells 5 and 8, resulting from operation of pump 32 and valves 39 and 36 under normal conditions, is a constant of the system and forms an important part of the data stored in core memory 25; as are the spectral-line locations and intensities of the reference standard gas (e.g., carbon dioxide) used to fill the reference cell 5, and the absorptivities and spectral locations corresponding to the various lines of interest for the constituents under assay.

Other means of pressure modulation may be equally well employed without exceeding the scope of appended claims. Advantageously pressure fluctuations may be applied through the action of acoustic drivers such as 161 and 162 in FIG. 3, installed as shown at the sides of calibration cell 105 and sample cell 108 respectively; and the configuration of the cells may be chosen to form with the acoustic drivers acoustically resonant cavities. This arrangement is advantageous relative to that of FIG. 1, in that (1) the number of moving parts is considerably smaller, thereby improving the instrument's reliability; and (2) the power required to maintain suitable pressure variation is smaller, for given pressure-variation amplitude, because a sizable dissipative component of physical operation is eliminated — namely, the repeated compression of air in cell 8, or cell 5 and chamber 31, by pump 32 of FIG. 1. Drivers 161 and 162 of FIG. 3 need supply only the power dissipated frictionally in gas displacement, not compression, in cell 108, or cell 105 and chamber 131, and the associated ports, to maintain resonant vibration; while compressive energy is conserved in resonant vibration, being "stored" as kinetic energy in alternate half-cycles.

Figure 3:
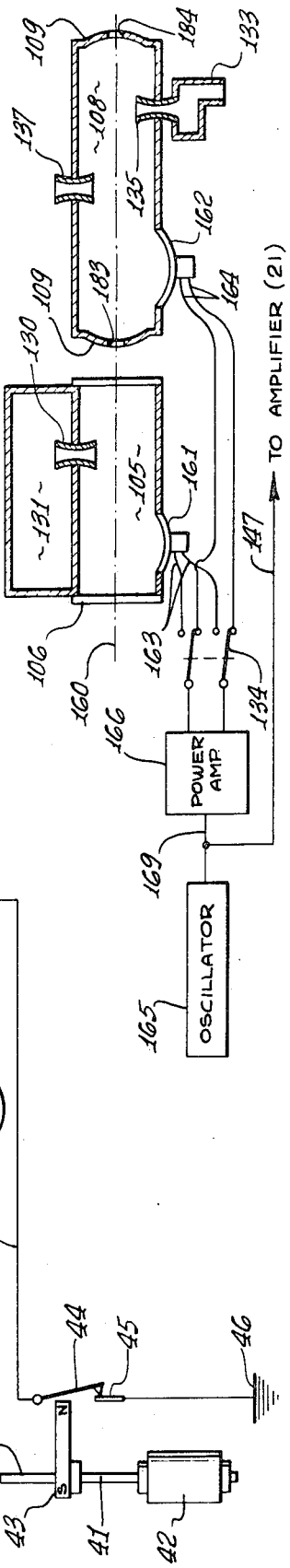
FIG. 3 represents an alternative form for the sample and calibration cells and their modulation provisions, relative to those illustrated in FIG. 1.

In the particular resonant structures illustrated in FIG. 3, the resonant character is determined by the configurations, locations and sizes of the tuned ports 130, 135 and 137, in conjunction with the cell walls per se, providing resonant behavior in physically small structures.

In the case of the sealed calibration cell 105, the port 130 must lead to an auxiliary enclosure 131, to obtain porting effect without disturbing the sealed character of the calibration cell. With suitable design, instantaneous pressure during vibration is substantially uniform throughout cells 105 and 108 respectively, and the cells may be located conveniently with respect to center-line 160 of the radiation path. Windows 106, 183 and 184, and reflective end-plates 109, are located with respect to center-line 160 substantially as windows 6, 83 and 84, respectively, are located with respect to center-line 60 in the apparatus of FIG. 1. Tuned ports 135 and 137 in sample cell 108 serve not only as active parts of the acoustic resonator but additionally serve the same functions as conduits 36 and 37, of FIG. 1, with appropriate means (not illustrated) being provided at one of ports 135 and 137 — as for example at 135 via tubulation 133 — for circulation of specimen gas through the cell; such circulation means may be provided in the form of a low-pressure blower or fan.

Alternatively to the structure shown, cells 105 and 108 may be formed as simple resonant cavities, the remote lateral walls of the laterally-extended cells reflecting acoustic vibrations excited at drivers 161 and 162; and the distance between driver and wall in each instance being chosen as 1.5 times the acoustic wavelength for the desired modulation frequency.

In either case, the acoustic drivers must be powered in some convenient fashion, as by oscillator 165 exciting via line 169 power amplifier 166, whose output may be switched as at 134 to energize either driver 161, via leads 163; or driver 162, via leads 164. Signal line 147 from oscillator 165 then functions in the same fashion as line 47 from reed switch 44, 45 of FIG. 1, to supply modulation-phase information to synchronous-demodulating filtered amplifier 21.

We claim:

1. Apparatus for analysis of gaseous specimens, comprising:

a radiation source and detector, and means defining a radiation path therebetween;

means defining a sample enclosure, positioned on the radiation path and at least partially radiation-transparent, for containing such gaseous specimen;

means for supplying a flow of such gaseous specimen to the sample enclosure;

means defining a sealed calibration enclosure positioned on the radiation path and at least partially radiation-transparent, for containing a reference substance;

whereby radiation from the source sequentially traverses both enclosures in reaching the detector;

modulation means for cyclically varying gas pressure in the sample and calibration enclosures, without displacing macroscopic objects in the radiation path;

control means for selecting only one-at-a-time of the two enclosures to be acted upon by the modulation means;

whereby the detector receives a cyclically varying radiant flux and generates a correspondingly varying output signal, whose amplitude depends on the constitution of the specimen when the control means select the sample enclosure, and whose amplitude depends on the constitution of the reference substance when the control means select the sealed calibration enclosure; and utilization means responsive to the detector, for registering a calibration parameter when the control means select the sealed calibration enclosure and for registering a specimen parameter when the control means select the sample enclosure.

2. The apparatus of claim 1, also comprising:

means narrowly limiting the spectral interval of radiation reaching the detector, whereby each parameter registered is correlated with a respective single narrow spectral interval of predetermined nominal wavenumber.

3. The apparatus of claim 2, wherein:

the limiting means function to select a plurality of narrow spectral intervals, whereby a plurality of calibration parameters is registered, each correlated respectively with a single narrow spectral interval of predetermined nominal wavenumber, when the control means selects the sealed calibration enclosure; and a corresponding plurality of likewise spectrally correlated specimen parameters is registered when the control means select the sample enclosure; and the utilization means comprise means for analyzing and comparing the two corresponding sets of pluralities of parameters to derive indices of the specimen constitution.

4. The apparatus of claim 3, wherein:

the analyzing and comparing means take account of the ratio of modulation amplitudes in the two enclosures, and of the known constituency and quantity of reference substance in the calibration enclosure.

5. The apparatus of claim 3, wherein:
the limiting means operates to select the plurality of narrow intervals serially; and
the utilization means comprise storage means to retain the pluralities of parameters in their respective correlations during such serial operation.

6. The apparatus of claim 1, wherein:
the control means select each one of the two enclosures for periods of time corresponding to many cycles of the modulation means;
whereby the detector output signal performs many cyclical variations corresponding to one of the two enclosures before the control means operates to select the other enclosure; and
the utilization means comprise means for averaging the detector output signal over many cyclical variations, thereby minimizing the noise contribution to the registered parameters.

7. The apparatus of claim 1, also comprising:
phase-sensitive means, synchronous with the modulating means, for causing the utilization means to receive signals corresponding substantially only to variations in radiant flux reaching the detector in appropriate phase relationship with the gas pressure variations;
thereby minimizing the effects of spurious signals at modulation frequency, and at other frequencies, due to radiant flux variations not caused by varying gas pressure in one of the enclosures; and also minimizing the effects of modulation-frequency and other-frequency spurious signals arising stochastically and arising systematically in the operation of the detector.

8. The device of claim 1, wherein:
the modulation means comprise electrically excited acoustic drivers in the respective enclosures; and
the enclosures are formed to be acoustically resonant at the frequency of cyclical variation of the gas pressure.

9. The device of claim 8, wherein:
the enclosures comprise tuned ports and are thereby dimensionally substantially smaller than one acoustic wavelength at atmospheric pressure and at the said frequency.

10. A small, inexpensive, hand-portable device for sensitive monitoring of air pollution and other gas constituents, comprising in combination:
a radiation source and means for projecting radiation therefrom along a radiation path to a radiation detector;
a calibration cell interposed on the radiation path and adapted for sealed containment of a reference substance;
a sample cell interposed on the radiation path and adapted for flow-through containment of sample gas for monitoring;
a pump connected to impel sample gas into the sample cell;
a cyclically driven valve for periodically varying sample-gas pressure in the sample cell, whereby the sample cell is pressure-modulated;
a chamber communicating with the calibration cell via a compliant seal;
a two-way valve for redirecting the pump's sample gas flow output to pass into the chamber instead of the sample cell;
a cyclically driven valve for varying periodically the gas pressure in the chamber when the pump output is passing into the chamber, thereby to vary the reference-substance pressure in the calibration cell via the compliant seal, whereby the calibration cell is pressure-modulated;
a spectral analyzer interposed on the radiation path for permitting only radiation in one narrow spectral band at a time to reach the detector;
an amplifier receiving and processing electrical signals from the detector and also responsive to the time phase at which the cyclically driven valves operate, to process substantially only signals which correspond to maximum radiation transmission when the pressure in the pressure-modulated cell is minimum, and minimum radiation transmission when the pressure in the pressure-modulated cell is maximum;
a computer responsive to processed signals from the amplifier and also to the instantaneous condition of the spectral analyzer, for generating and storing parameters related to signals processed while the pump output is passing into the chamber, using these stored parameters as calibration data in computing sample-gas-constituent data while the pump output is passing into the sample cell, and storing the gas-constituent data for subsequent readout.

11. The device of claim 10, wherein:
the sample cell is a multi-pass type;
the spectral analyzer is a variable interference filter consisting of an annular interference filter, whose thickness is different at different locations along the annulus, and which is driven in rotation about the axis of the annulus by a motor; and
a shaft encoder functionally connected to the motor, to provide information to the computer as to the instantaneous position of the filter, this position being the said instantaneous condition.

* * * * *